Oct. 12, 1937.  C. THEILER  2,095,578
PROCESS FOR THE DISTILLATION OF LIQUIDS
Original Filed July 29, 1933  3 Sheets-Sheet 1
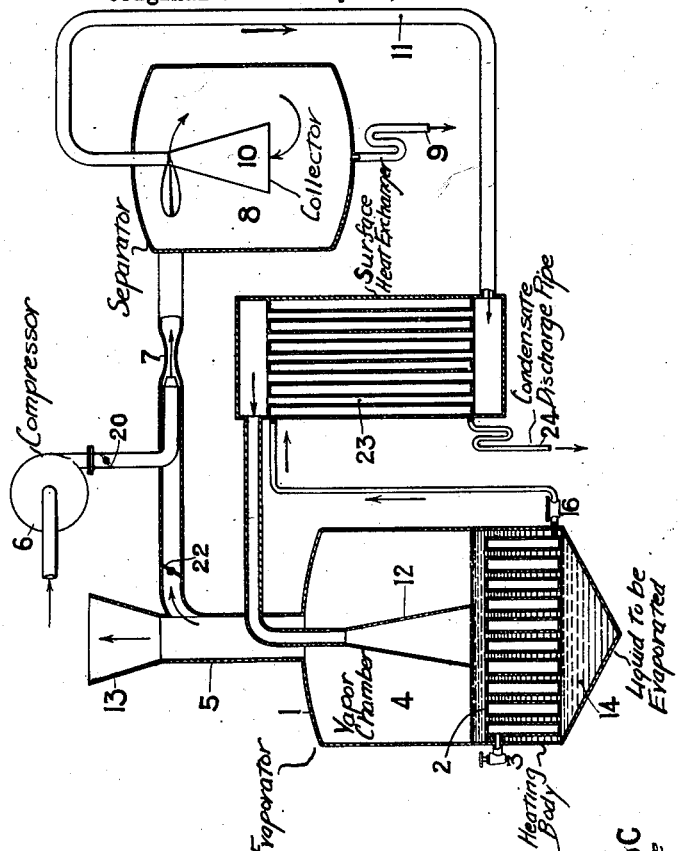
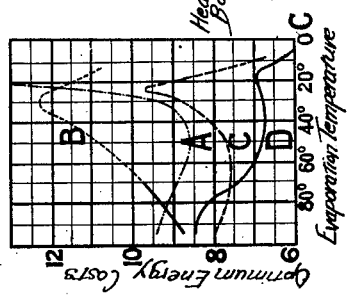
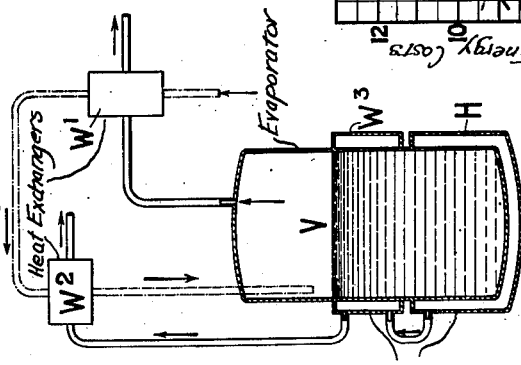
Inventor:
Casimir Theiler Patented Oct. 12, 1937

2,095,578

UNITED STATES PATENT OFFICE 2,095,578

PROCESS FOR THE DISTILLATION OF LIQUIDS

Casimir Theiler, Basel, Switzerland, assignor to the firm of Society of Chemical Industry in Basle, Basel, Switzerland Original application July 29, 1933, Serial No. 682,891. Divided and this application May 8, 1935, Serial No. 20,504. In Switzerland August 12, 1932

9 Claims. (Cl. 202—48)

This application is divisional of application Ser. No. 682,891, now Patent No. 2,042,488, filed by the same applicant on July 29, 1933. The latter application relates to a process of evaporation to concentrate solutions, suspensions and the like. Collection of the evolved vapor phase is not intended therein. The present application, on the other hand, relates to a distillation process, one of the main features being to condense the resulting vapor phase and to collect the same.

In evaporating or distilling systems it has hitherto been possible to increase the heat economy and in part also the efficiency of evaporating by means of vacuum, multi-stage effect and heat pumps. For the evaporation or distillation of liquids sensitive to temperature changes vacuum has been used, but this increased the expenditure of energy and the costs. Evaporators are also known, which, by the introduction of air make it possible to realize an evaporation temperature of a liquid below its boiling point at atmospheric pressure. Such systems are, however, uneconomical as the air is introduced at a temperature considerably lower than that corresponding to the evaporation point, whereby an increased consumption of heat by the evaporating system is necessary in order to raise the temperature of the air to the evaporation temperature.

Further, such evaporators need a great excess of air, owing to the unfavorable saturation conditions of the air, so that in addition to the great amount of heat required the consumption of energy also is increased. On the other hand, evaporators have been proposed, in which the heat for the evaporation or distillation at reduced temperature is introduced by means of heated air. These systems have, compared to the space they require, a very small efficiency and are not economical because of the large surface of liquid which is necessary.

It has now been discovered that distillation can be carried out in a very economical manner and that also the drawbacks of the known evaporating systems can be avoided, if in a heated distilling vessel V of the kind diagrammatically represented in Figure 1 of the accompanying drawings an auxiliary gas is introduced thereinto and brought therein into intensive contact with the liquid to be distilled in order to reduce the partial pressure of the vapor of the liquid and therefore the evaporation temperature of the liquid and if additionally, the gas is conveyed before its admission to the heated distilling vessel, successively into a heat exchanger $W_1$ for recovering the heat of the mixture of gas and vapor leaving the distilling vessel and into a heat exchanger $W_2$ for utilization of the waste heat of the heating devices H and $W_3$. The vapor phase condensed in the heat exchanger and in the condensers and coolers is separated from the gas and collected as distillate.

The reduction of the temperature of distillation of the liquid is a consequence of the presence of the auxiliary gas which does not take part in the distillation proper. The total pressure during distillation being maintained constant, the auxiliary gas effects a reduction, in proportion to the gas quantity flowing over the liquid, of the pressure of the vapor phase according to the law of Dalton and, consequently, of the temperature of distillation of the liquid. This pressure portion with respect to the total pressure is called "partial pressure" and depends in particular also on the phase equilibrium.

The utilization of the incidental or secondary heat given off from the distilling system, while maintaining thermodynamic equilibrium between the gas and the vapor phase of the liquid, is a primary feature of the present distillation process, which renders the same more economical and more efficient than known processes of this kind.

The new process, therefore, affords, as will hereinafter be explained with regard to Fig. 2, great technical and economical advantages over the processes referred to in the introductory paragraphs of this specification. It admits a multiple applicability in the distillation of one-phase and multiple-phase mixtures. Of particular interest in this regard is fractional condensation whereby a plurality of isomers may readily be separated. In the rectification of liquid mixtures also, it allows a sharp separation of the vapors resulting from distillation. Other applications and advantages of the process will be referred to in the course of the following description.

With a distillation temperature situated below the temperature at which the gas enters the heat exchanger, the heat economy is still further increased by the utilization of the heat supplied from outside. Although at lower temperatures the amount of power required for delivering the gas increases, distillations for instance at 15° C. are still considerably more economical than those under vacuum.

The present invention will be more fully described by reference to the accompanying drawings, but without the scope of the invention being limited to the typical embodiments illustrated therein.

In the said drawings,

Fig. 1 is a diagrammatic view of a device embodying the principle of the present invention;

Fig. 2 is a chart wherein the operation cost is plotted against the distillation temperatures; and Figs. 3-5 are respectively schematic sections through three different embodiments of the invention.

Figure 4:
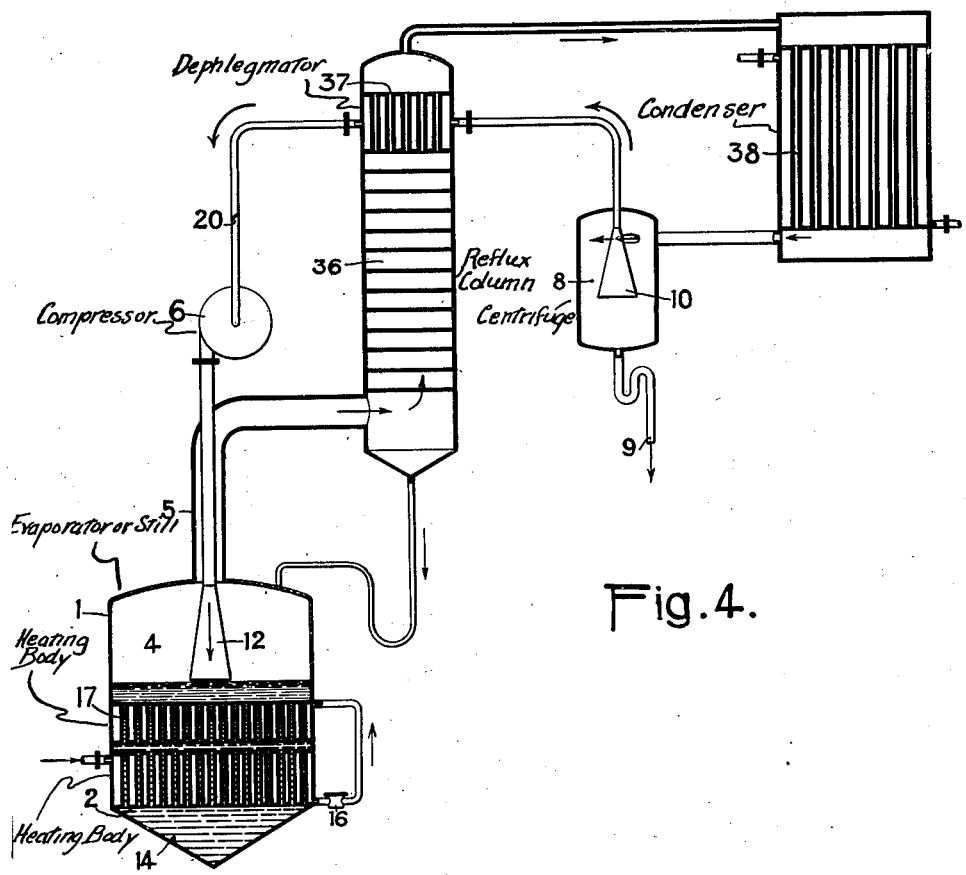

Figure 2 shows a comparison of the optimum energy costs per unit weight of liquid subjected to disillation as a function of the distillation temperature for, for instance, continuous distillation of water with vapor as heating agent, the abscissa representing the temperature of distillation and the ordinate the optimum energy costs per unit weight of liquid. Curve A represents the cost units of energy for vacuum distillation with utilization of condensation heat, and curve B that for known stills, with introduction of air at 20° C. and with a relative humidity of 50 per cent, whereby the costs for the range of low temperatures which can only be employed in the new process, are indicated by a dotted section of said curve. Curve C shows the energy costs for the new process with partial pressure distillation, while introducing air into the still and recovering the heat of the mixture of air and vapor by way of direct heat exchange and that of the condensate by way of indirect heat exchange, and still utilizing at lower temperatures the heat of the difference of temperature. Curve D indicates the costs of the partial pressure distillation with recovery of the heat of the air and vapor mixture by way of indirect heat exchange, extended also to the ranges of low evaporation temperatures. When using a gas of a relative humidity below 50 per cent, the costs are even considerably more favorable.

Experiments have confirmed that, with the use of a partial pressure distillation, with given conditions of operation and unit energy costs, savings exceeding 30 per cent. are obtained as compared with similar conditions in known evaporating or distilling systems. They have also shown that the distilling efficiency, according to the nature of the heating agent used, is greater, in that it may amount to over 20 per cent. more than corresponds with the theoretical raising of the temperature gradient, between the temperature of the heating agent and the temperature of the distillation point associated to the partial pressure in the distilling system. This observation can be explained by the fact that no vapor bubbles can form on the heating surface as with the actual known evaporating or distilling systems, which would render the heating surface partially ineffective.

These advantages of partial pressure distillation, when combined with additional evaporators, which are per se very economical in respect of heat, produce still more favorable results.

The new process is suitable not only at low distillation temperatures for utilizing low pressure vapor or negative pressure vapor and the waste heat from furnaces, for increasing the distillation efficiency, and also for treating products which are temperature sensitive, but also for the reduction of the distillation temperature of substances of high boiling point. This latter reduction of temperature which can at the same time be increased by the expedient of an alternation of pressure, combines the said technical advantages also with chemical advantages, such as checking decomposition, influencing chemical reactions, etc. Thereby new possibilities appear for carrying out, for instance, distillation of mixtures of high boiling point, such as those of the lubricating oil group, which are otherwise technically difficult to control. Further, it is associated with a favorable heat recovery.

The partial pressure distillation can also be used advantageously above atmospheric pressure, as with the assumption of equal specific gas contents (quantity of gas pro distilled quantity of liquid) the absolute temperature gradient between the distillation temperatures corresponding to the total pressure and to the partial pressure increases with higher pressure.

The new process is suitable for distillations and rectifications of liquid mixtures not only on account of the thermo-technical advantages, but also on account of the considerably smaller loss of solvents of lower boiling point as compared with similar conditions under vacuum, as according to the latter method considerable losses occur due to the great pressure difference and leakages in the apparatus resulting from the negative pressure.

For the distillation of substances sensitive to oxygen there may be used with advantage as agents for the reduction of the partial pressure, inert gases, such as waste gases from furnaces and industrial plants, nitrogen, hydrogen and the like.

The increase of distillation is particularly advantageous for apparatus used in the chemical industry, as for these, in consideration of the purpose of application, the greatest possible heating surfaces with boiler volume are fixed and generally cannot be increased.

The new process is found to be particularly suitable for the distillation of liquids, which contain volatile, corrosive substances, such as acids and alkalies. For carrying off the acid or alkaline gas and vapor mixture, when using the vacuum distillation method, expensive apparatus and machines, partially of corrosion-resistant materials, are necessary, whereas with the new process simple constructions of cheap material can be used. The distillation can be conducted for instance with an excess of gas in accordance with Henry-Dalton's law, in such a manner that the escaping acid or alkaline mixture of gas and vapor is unsaturated, that is to say leaves the distilling vessel superheated, whereby the construction materials are less subjected to chemical attack.

A further advantage of the new process is that it is also suitable for the distillation of foaming liquids also at low temperatures. By introducing the gas in condition of division or distribution over all the surface of the liquid, the foam produced on distillation is immediately destroyed in statu nascendi. It is therefore possible to concentrate by distillation strongly foaming liquids, which in vacuo can not be distilled at all, without great difficulty by means of the present partial pressure distillation.

The heat recovering in the heat exchangers $W_1$ and $W_2$ according to Figure 1 can be realized by indirect transmission of heat, such as for instance by surface heat exchange, or by means of direct heat transmission such as for instance mixing between the heat yielding agent and the auxiliary gas.

The mixture of gas and vapor flowing off from the distilling system may be conducted to a suitable additional evaporator for still further utilization. Further, by partial condensation the specific gas content can be increased, and this mixture, richer in gas, can be entirely or partly again utilized as agent for the reduction of the partial pressure by returning same in the circuit to the same system.

The liquid phase of the mixture of gas and vapor eliminated by partial condensation may be separated from the gaseous vapor phase by suitable separators.

For the circulation of the auxiliary gas, there may be used, according to the pressure conditions, devices such as fans, compressors or the like.

The auxiliary gas may be introduced by means of distributors, for instance diffusers or the like over, on or under the level of the liquid, in such a manner that it is removed quickly in as saturated a state as possible from the surface of the liquid to be distilled.

As agent for the reduction of the partial pressure there may be used gases or mixtures thereof with vapors, which in addition to the physical function are also, if necessary, capable of performing a chemical action, for instance hydrogenization, oxidation and the like. Gases with small molecular weight have smaller specific gas contents but are not essentially more favorable in the heat and energy balance. On the other hand, such gases with greater heat conductivity such as for instance hydrogen, offer special advantages in respect of heat transmission in the heat exchanger and condenser.

For the heating of the still or distilling system there may be used heating vapor of different pressure, particularly low pressure vapor, circulating heating liquids such as water, oil or the like, heating gases or furnaces supplied with oil, gas, coal or the like.

Figure 3 shows by a sectional view the arrangement of an open partial pressure distilling apparatus according to the invention. 1 represents the still, 2 is the heating body thereof provided with an entry 3 for the heating agent, 4 is the chamber in the still 1 for the mixture of gas and vapor and 5 the pipe for carrying off the mixture of gas and vapor. The auxiliary gas for the reduction of the partial pressure of the liquid 14 to be distilled, for instance air, is supplied by the fan or compressor 6 to an ejector-like suction device 7, which by way of a regulatable throttle valve 22 draws off at least a part of the air and vapor mixture flowing off through the pipe 5. By way of mixing, a direct heat exchange takes place between the cold air and the warm mixture of air and vapor before the entry thereof into the separator 8, whereby vapor is condensed from the mixture. The liquid of condensation is separated from the air and vapor mixture in the separator 8 by centrifugal action and removed through the outlet 9 to collect the same. The mixture of air and vapor which is richer in air is conveyed by way of the collector 10 and pipe 11 into a surface heat exchanger 23 in order to be heated, from which it is returned to the still 1 where by means of the distributor 12 it is brought into intensive contact with the liquid in the still, for instance below the liquid level therein. The remaining part of the mixture of air and vapor flowing off through pipe 5 escapes by way of the discharge opening 13 to the atmosphere or can be further utilized for other purposes, as for instance in the multi-stage apparatus according to Figure 5, where for example the said remaining part of air and vapor mixture can be introduced thereinto through the throttle valve 20 and fan 6 or by other connecting means.

The heating of the still 1 is effected in this arrangement by means of vapor. The water of condensation of the heating body 2 is delivered through the discharge pipe 16 to the surface heat exchanger 23 where it gives off its heat to the air to be introduced into the still. By this means, the vapor heat liberated by the relief of pressure, as well as the heat of the condensate can be utilized up to the temperature of the entering air. The cooled condensate flows off from the heat exchanger 23 by way of the discharge pipe 24. By heating the air to be introduced, the same is enabled to again take up humidity.

When operation takes place within such ranges of temperature, for which the air introduced through the throttle valve 20 has a higher temperature than the still temperature of the liquid 14, it is advantageous to work with closed throttle valve 22. Under these conditions, only the waste heat of the heating agent is utilized in the heat exchanger 23 for the heating of the air to be introduced.

Figure 4 shows a closed partial pressure still with circulation of the auxiliary gas. This form of construction is particularly suitable for distillation of liquids, such as liquids of a low boiling point. The arrangement as represented is particularly suitable for fractionating by rectification and dephlegmation of various liquid mixtures, also those of azeotropic kind. Thus it is possible to produce also technically anhydrous alcohol by fractionating under partial pressure. As is well-known, at low temperatures the azeotropic point is displaced into the range of higher alcohol contents. The new process, as compared with the rectification in vacuo, is very economical, as the alcohol losses are reduced to a minimum.

The system is also particularly suitable for mixtures of high boiling point, which hitherto have been treated in vacuo according to known processes for instance fractionating of lubricating oils, etheric oils, tars for distillation, etc.

The method according to Figure 4 is realized at any pressure in such a way that the mixture of gas and vapor flowing from the body of the still 1 passes into a column system 36 where a thorough mixing and also a heat exchange of the mixture of gas and vapor and reflux takes place, whereby the vapor composition of the mixture of gas and vapor changes in such a manner that the vapor component is strengthened or enriched. This latter mixture flows through a dephlegmator 37, in which by heat transmission to the gas returned into the circuit, a part of the distillation vapors is precipitated by cooling and conducted as reflux into the column 36, whereas the mixture of gas and vapor which is richer in gas is cooled in the condenser 38. By separation in the separator 8, the distillate is removed by way of the discharge pipe 9 to collect the same and the gas is conducted by way of the dephlegmator 37 and the delivery device 6 back to the body of the still where it is brought through the distribution 12 into intensive contact with the liquid contained in the still. If a larger reflux is necessary than corresponds to the heat exchange in the dephlegmator 37, such reflux will be obtained by a further cooling in known manner of the mixture of gas and vapor flowing off from the dephlegmator 37.

The aforedescribed apparatus is set into operation as follows: In the still 1 the liquid mixture is heated by the heating systems 2 and 17 to the desired temperature of distillation and the fan 6 is set in motion. The gas caused to circulate in the apparatus becomes heated by its contact with the vapors evolved from the liquid and also by heat exchange in dephlegmator 37. The expansion of the gas would increase the total pressure in the apparatus if the syphon-like outlet 9 or other detent device were not inserted into the apparatus to compensate such increase of pressure. Accordingly, the distillation takes place at a total pressure which always remains constant in the apparatus. Consequently, according to the law of Dalton, the partial pressure of the vapor phase is reduced.

The heating of the still 1 is effected with steam by means of the heating body 2. The heat of the condensate in said body 2 can be utilized for distillation in such a manner that the condensation water is conducted from the heating body 2 by way of a discharge member 16 to a further heating body 17, whereby the vapor heat liberated by the relief of pressure, as also the heat of the condensate, can be utilized up to distillation temperature. The intermediate heating body 17, for the sake of better utilization of the heat of the condensate caused by the low hydrostatic level of the liquid in the still 1, is to be arranged above the main heating body 2.

In case of distillation of liquids with high boiling point, such as lubricating oils or the like, the heating of the still 1 is preferably produced by means of a furnace with gas, oil or coal supply.

In all cases, the utilization of the waste heat of the heating device of the still can take place, as was described in regard to Figure 3, by heating the gas to be introduced into the still in a heat exchanger like that 23 of Figure 3 inserted into the air admission pipe leading to the still.

The methods of carrying out the process described according to Figures 3 and 4 may also be applied to the combination of a distilling system with several additional evaporating stages arranged in series and in which the heating of a final stage is effected by the vapors of a preceding stage.

Figure 5:
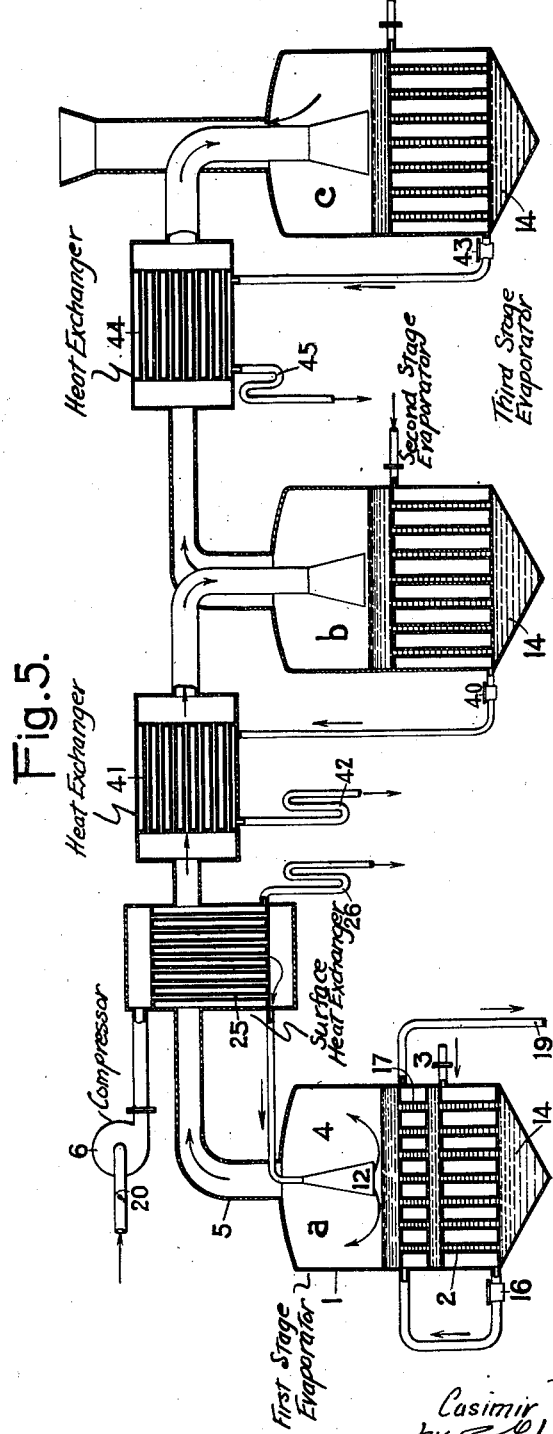

Figure 5 represents a combination of this kind. In this figure, $a$ is the distilling stage, $b$ and $c$ are two evaporating or concentrating stages.

In the distilling stage $a$, air is conducted by way of the throttle valve 20 and the fan 6 to a surface heat exchanger 25 and by way of the distributor 12 to the still 1 where it comes in intensive contact with the liquid contained therein. From the mixture of air and vapor flowing off, by indirect heat emission to the air, a part of the vapor is condensed and is carried off as condensation liquid by way of the discharge pipe 26 to be collected, whereas the mixture of air and vapor which is poorer in vapor is thereafter heated in the heat exchanger 41 by the heat of the condensate from stage $b$ and passes then through the distributor into the evaporator of stage $b$. In the evaporator of stage $b$, owing to evaporation, the specific air content decreases, and the evaporation temperature of the solution is correspondingly raised. Similarly the mixture is delivered by way of the heat exchanger 44 to the evaporator of stage $c$, where the evaporation point is still further raised. If, for instance, the dilute solution to be treated is allowed to flow continually over from stage $c$ by way of stage $b$ to stage $a$, it is possible to maintain a prescribed temperature gradient between the heating agent and the solution and therefore a definite performance in every stage in spite of great rise of the boiling point of the solution which is concentrated from stage to stage. It is also possible to cause the liquid to be treated to move in the opposite direction, which is advantageously the case, for instance, with solutions which are temperature-sensitive in the initial concentration, but in that case the evaporation or distillation output is reduced.

In order to be able to maintain the most favorable utilization of heat for a definite distillation point, there should be provided regulation of the distillation temperature by alteration of the quantity of the auxiliary gas to be introduced into the distilling system, or influencing the cooling action of the condenser or a combination of both measures. In order to maintain the optimum economy, the two throttle valves 20 and 22 in Figure 3 may for instance be adjusted by a suitable regulating device, in such a manner that the specific gas content and, therefore, the distillation temperature itself on variation of the temperature and the relative humidity of the auxiliary gas, and also of the heating medium temperature, is always maintained constant. Such regulation, particularly at low distillation temperatures in whose regions the energy expenditure curve falls or rises very steeply, exhibits great advantages and is, therefore, indispensable for economic operation.

Whilst the process as claimed in the U. S. application Ser. No. 682,891 serves to evaporate liquids in order to obtain concentrated solutions, suspensions or the like, the process of the present application serves for distillation purposes as described above and is thus enabled to find other and more multiple applications, as by this process for example multiphase mixtures can be treated, the vapors escaping on the distillation being condensed and collected as finished products. The present process especially permits a fractionated condensation which allows to easily separate mixtures of liquids with neighbouring boiling points, such as chemical isomers often to be handled in chemistry. Another field of application for this process is the rectification allowing a sharp and refined separation of the vapors resulting on the distillation.

What I claim is:—

1. A process for the distillation of liquids, especially temperature-sensitive liquids, in a heated still supplied with an auxiliary gas which is not condensable at the pressure of the distillation, consisting in bringing said gas within the still into intensive contact with the liquid therein over a large surface area, reducing thereby the partial pressure of the liquid and its distillation temperature, then evacuating at least part of said gas in admixture with vapor from the still, condensing at least part of the vapor phase of the gas and vapor mixture, collecting at least part of the condensate thus formed, and transferring by way of heat exchange, for recovery, the waste heat of the heating system of the still to the gas to be introduced into the still.

2. A process for the distillation of liquids, especially temperature-sensitive liquids, in a heated still supplied with an auxiliary gas which is not condensable at the pressure of the distillation, consisting in bringing said gas within the still into intensive contact with the liquid therein over a large surface area, reducing thereby the partial pressure of the liquid and its distillation temperature, then evacuating at least part of said gas in admixture with vapor from the still, condensing at least part of the vapor phase of the gas and vapor mixture, collecting at least part of the condensate thus formed, and transferring by way of heat exchange, for recovery, both the heat of the evacuated gas and vapor mixture and the waste heat of the heating system of the still to the gas to be introduced into the still.

3. A process for the distillation of liquids, especially temperature-sensitive liquids, in a heated still supplied with an auxiliary gas which is not condensable at the pressure of the distillation, consisting in bringing said gas within the still into intensive contact with the liquid therein over a large surface area, reducing thereby the partial pressure of the liquid and its distillation temperature, then evacuating at least part of said gas in admixture with vapor from the still, condensing at least part of the vapor phase of the gas and vapor mixture, collecting at least part of the condensate thus formed, returning the gas in circuit back to the still, and transferring by way of heat exchange, for recovery, the heat of the evacuated gas and vapor mixture to the gas to be introduced into the still.

4. A process for the distillation of liquids, especially temperature-sensitive liquids, in a heated still supplied with an auxiliary gas which is not condensable at the pressure of the distillation, consisting in bringing said gas within the still into intensive contact with the liquid therein over a large surface area, reducing thereby the partial pressure of the liquid and its distillation temperature, then evacuating at least part of said gas in admixture with vapor from the still, condensing at least part of the vapor phase of the gas and vapor mixture, collecting at least part of the condensate thus formed, returning the gas in circuit back to the still, and transferring by way of heat exchange, for recovery, both the heat of the evacuated gas and vapor mixture and the waste heat of the heating system of the still to the gas to be introduced into the still.

5. A process for the distillation of liquids, especially temperature-sensitive liquids, in a heated still supplied with an auxiliary gas which is not condensable at the pressure of the distillation, consisting in bringing said gas within the still into intensive contact with the liquid therein over a large surface area, reducing thereby the partial pressure of the liquid and its distillation temperature, then evacuating at least part of said gas in admixture with vapor from the still, condensing at least part of the vapor phase of the gas and vapor mixture, collecting at least part of the condensate thus obtained, causing another part thereof to flow in opposite direction to the gas and vapor mixture evacuated from the still to effect rectification of the vapor phase, returning the gas in circuit back to the still, and transferring by way of heat exchange, for recovery, the heat of the evacuated gas and vapor mixture to the gas to be introduced into the still.

6. A process for the distillation of liquids, especially temperature-sensitive liquids, in a heated still supplied with an auxiliary gas which is not condensable at the pressure of the distillation, consisting in bringing said gas within the still into intensive contact with the liquid therein over a large surface area, reducing thereby the partial pressure of the liquid and its distillation temperature, then evacuating at least part of said gas in admixture with vapor from the still, condensing at least part of the vapor phase of the gas and vapor mixture, collecting at least part of the condensate thus obtained, causing another part thereof to flow in opposite direction to the gas and vapor mixture evacuated from the still to effect rectification of the vapor phase, returning the gas in circuit back to the still, and transferring by way of heat exchange, for recovery, both the heat of the evacuated gas and vapor mixture and the waste heat of the heating system of the still to the gas to be introduced into the still.

7. A process for the distillation of liquids, especially temperature-sensitive liquids, in a heated still supplied with an auxiliary gas which is not condensable at the pressure of the distillation, consisting in bringing said gas within the still into intensive contact with the liquid therein over a large surface area, reducing thereby the partial pressure of the liquid and its distillation temperature, then evacuating at least part of said gas in admixture with vapor from the still, condensing at least part of the vapor phase of the gas and vapor mixture, collecting at least part of the condensate thus formed, and transferring by way of heat exchange, for recovery, the waste heat of the heating system of the still to the gas to be introduced into the still and utilizing also the heat contained in the auxiliary gas for the distillation in the still.

8. A process for the distillation of liquids, especially temperature-sensitive liquids, in a heated still supplied with an auxiliary gas which is not condensable at the pressure of the distillation, consisting in bringing said gas within the still into intensive contact with the liquid therein over a large surface area, reducing thereby the partial pressure of the liquid and its distillation temperature, then evacuating at least part of said gas in admixture in unsaturated condition with vapor from the still, condensing at least part of the vapor phase of the gas and vapor mixture, collecting at least one part of the condensate thus formed, and transferring by way of heat exchange, for recovery, the waste heat of the heating system of the still to the gas to be introduced into the still and utilizing also the heat contained in the auxiliary gas for the distillation in the still.

9. A process for the distillation of liquids, especially temperature-sensitive liquids, in a heated still supplied with an auxiliary gas which is not condensable at the pressure of the distillation, consisting in bringing said gas within the still into intensive contact with the liquid therein over a large surface area, reducing thereby the partial pressure of the liquid and its distillation temperature, then evacuating at least part of said gas in admixture in unsaturated condition with vapor from the still, condensing at least part of the vapor phase of the gas and vapor mixture, collecting the condensate thus formed, conveying the evacuated gas into at least one additional evaporator for utilizing same therein, and transferring by way of heat exchange, for recovery, the waste heat of the heating system of the still to the gas to be introduced into the still and utilizing also the heat contained in the auxiliary gas for distillation in the still.

CASIMIR THEILER.